US006301772B1

(12) United States Patent
Cheng

(10) Patent No.: US 6,301,772 B1
(45) Date of Patent: Oct. 16, 2001

(54) MODULE JACK WIRE CRIMPING/CUTTING TOOL

(76) Inventor: Yin-Ho Cheng, No. 58, Chungshan Rd., Tucheng Industrial Zone, Taipei County (TW)

( * ) Notice: Subject to any disclaimer, the term of this patent is extended or adjusted under 35 U.S.C. 154(b) by 0 days.

(21) Appl. No.: 09/657,618

(22) Filed: Sep. 8, 2000

(51) Int. Cl.[7] .............................. H01R 43/00; B23P 19/02

(52) U.S. Cl. ............................ 29/566.4; 29/751; 173/203

(58) Field of Search ................................ 29/566.4, 566.1, 29/203 P, 203 H, 751, 753, 752, 56.5; 173/203, 205, 206, 202, 120, 126

(56) References Cited

U.S. PATENT DOCUMENTS

| | | | | |
|---|---|---|---|---|
| 3,708,852 | * | 1/1973 | Mason | 29/749 |
| 3,742,573 | * | 7/1973 | Kaufman | 29/56.5 |
| 3,898,724 | * | 8/1975 | Conorich | 29/566.4 |
| 3,906,608 | * | 9/1975 | Charron et al. | 29/751 X |
| 3,997,956 | * | 12/1976 | McKee | 29/749 X |
| 4,241,496 | * | 12/1980 | Greeson | 29/751 |
| 4,567,639 | * | 2/1986 | Fasano | 29/566.4 |
| 5,175,921 | * | 1/1993 | Krietzman | 29/566.4 |
| 5,842,268 | * | 12/1998 | Arnfield | 29/566.4 |

FOREIGN PATENT DOCUMENTS

| | | | | |
|---|---|---|---|---|
| 3432028 | * | 3/1985 | (DE) | 29/566.4 |

* cited by examiner

*Primary Examiner*—William Briggs
(74) *Attorney, Agent, or Firm*—Rosenberg, Klein & Lee

(57) ABSTRACT

A module jack wire crimping/cutting tool is constructed to include a barrel supported on a spring in a tubular handle, two arched stop elements forced by springs to releasably close the rear end of the barrel and to stop a spring-supported bolt in the barrel, and a stem moved in and out of the front end of tubular casing to hold a crimping/cutting block, which is forced by the spring-supported bolt to crimp and cut electric wires at a module jack upon forward movement of the tubular casing relative to the barrel after attaching the crimping/cutting block to the module jack.

1 Claim, 6 Drawing Sheets

MODULE JACK WIRE CRIMPING/CUTTING TOOL

BACKGROUND OF THE INVENTION

The present invention relates to a wire crimping/cutting tool, and more specifically to a module jack wire crimping/cutting adapted to crimp and cut electric wires at a module jack.

Regular wire crimpers for crimping module jack wires are commonly heavy and complicated. After crimping, a separate cutting tool must be used to cut the electric wires.

SUMMARY OF THE INVENTION

It is one object of the present invention to provide a module Jack wire crimping/cutting tool, which has a simple structure. It is another object of the present invention to provide a module jack wire crimping/cutting tool, which is inexpensive to manufacture. It is still another object of the present invention to provide a module jack wire crimping/cutting tool, which is practical to crimp and cut module jack wires at one time. It is still another object of the present invention to provide a module jack wire crimping/cutting tool, which requires less effort to crimp and cut module jack wires.

DETAILED DESCRIPTION OF THE PREFERRED EMBODIMENT

Figure 1:
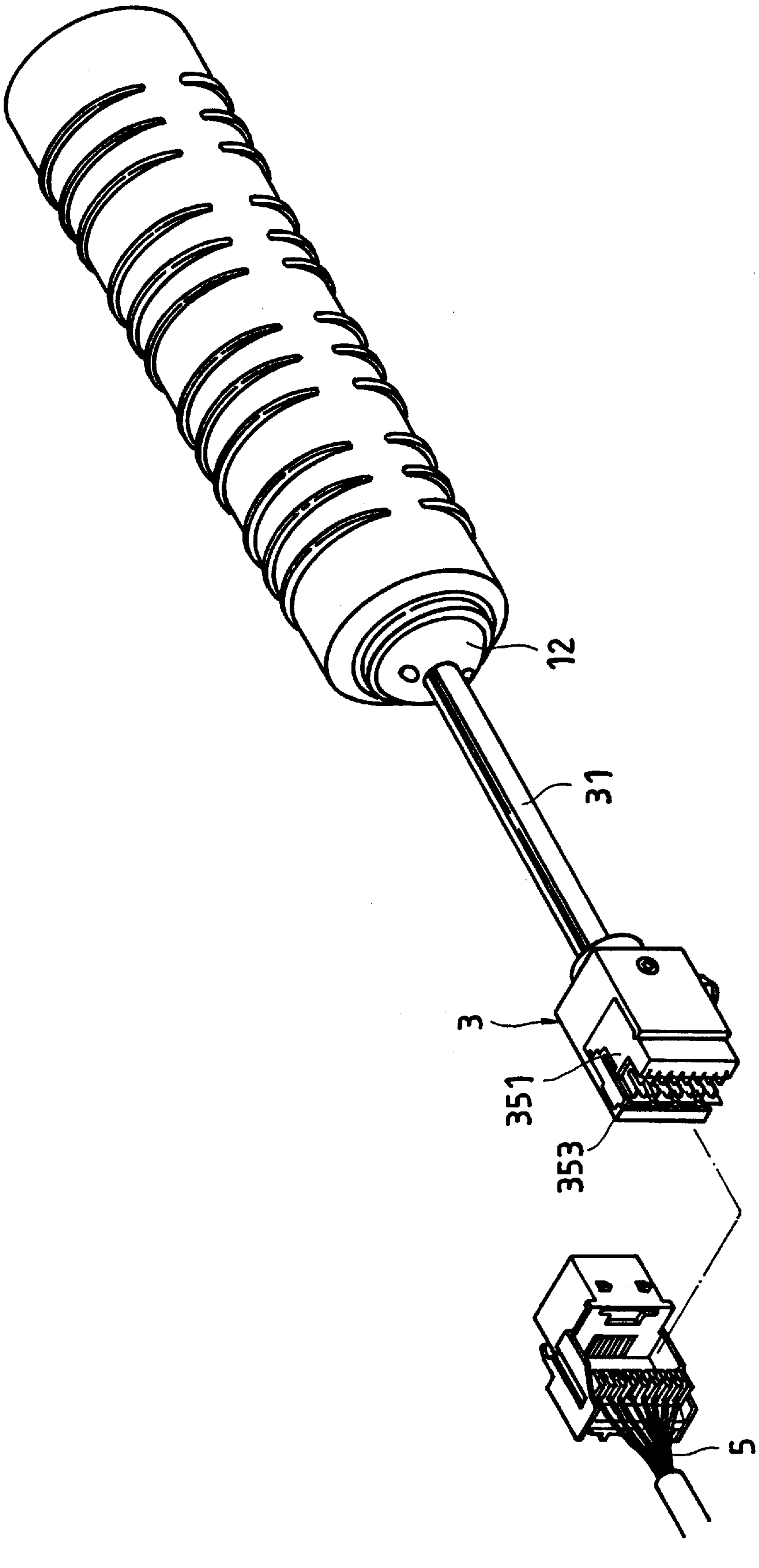
FIG. 1 is a perspective view of a module jack wire crimping/cutting tool according to the present invention.
Figure 2:
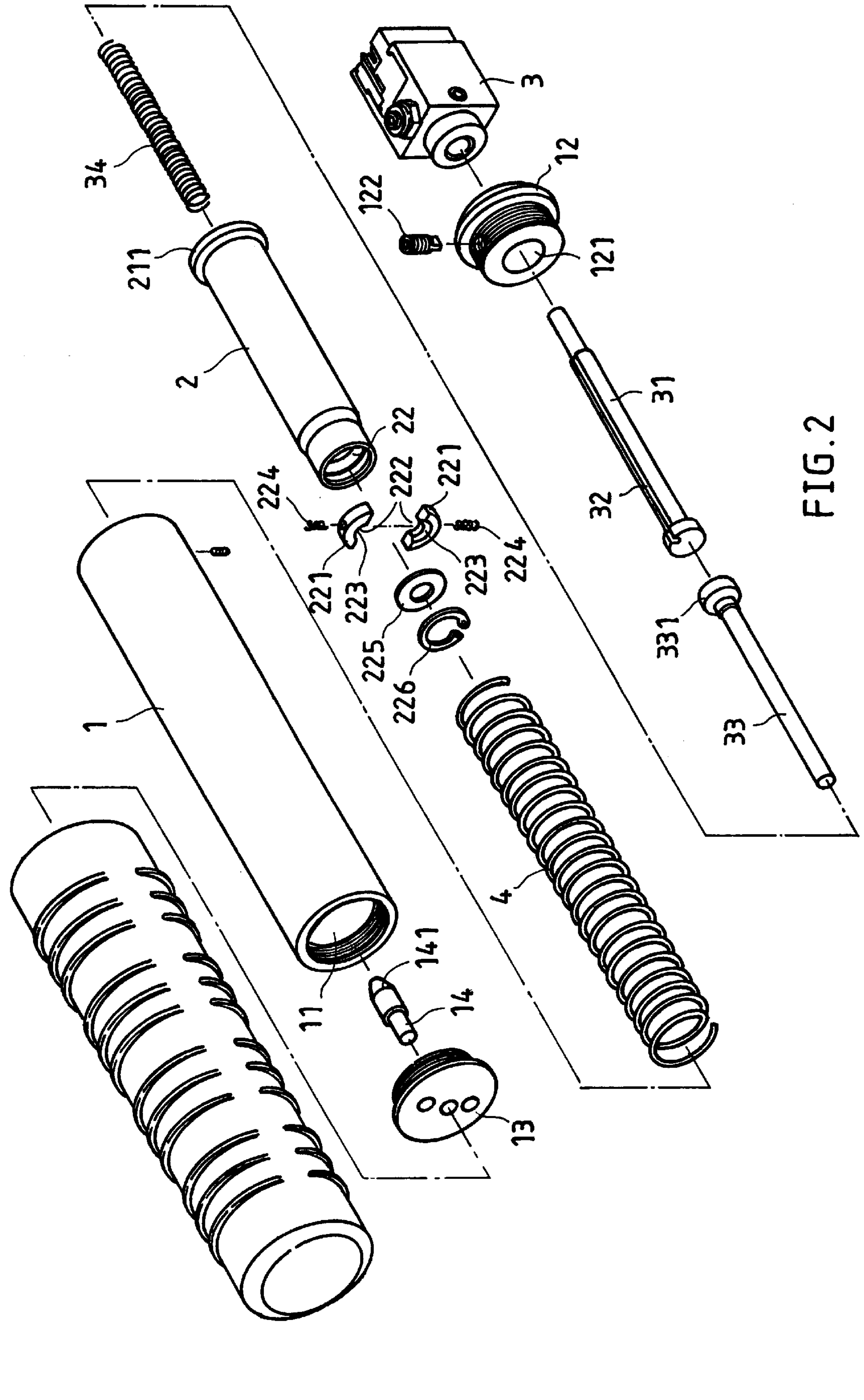
FIG. 2 is an exploded view of the module jack wire crimping/cutting tool according to the present invention.

Referring to FIGS. from 1 through 3, a module jack wire crimping/cutting tool in accordance with the present invention is shown comprising a tubular handle 1. The tubular handle 1 defines an axially extended center through hole 11. A rear end cap 13 and a front end cap 12 are respectively fastened to two distal ends of the tubular handle 1. The front end cap 12 has a center through hole 121. A rod member 14 is fixedly fastened to the center of the rear end cap 13 and suspended in the axially extended center through hole 11 of the tubular handle 1, having a conical front tip 141. A barrel 2 is axially slidably mounted in the axially extended through hole 11 of the tubular handle 1, comprising an outward flange 211 raised around the periphery of the front end thereof, a rear receiving chamber 22 disposed at the rear end thereof, and a stepped through hole 21 axially extended from the rear receiving chamber 22 to the front end. A first compression spring 4 is mounted inside the tubular handle I around the barrel 2, having one end supported on the rear end cap 13 around the rod member 14 and the other end stopped at the outward flange 211 of the barrel 2. The first compression spring 4 imparts a forward pressure to the outward flange 211 of the barrel 2, forcing the outward flange 211 of the barrel 2 into contact with the front end cap 12. A bolt 33 is mounted in the stepped through hole 21 of the barrel 2 and moved in and out of the rear receiving chamber 22, having a head 331 at its one end. A second compression spring 34 is mounted in the stepped through hole 21 of the barrel 2 around the bolt 33, having one end stopped at a part inside the barrel 2 near the rear receiving chamber 22 and the other end stopped at the head 331. The second compression spring 34 imparts a forward pressure to the head 331 of the bolt 33, keeping the bolt 33 suspended inside the barrel 2. A washer 225 and a C-shaped clamp 226 are fastened to the rear end of the barrel 2 to hold two arched stop elements 221 in the rear receiving chamber 22. The arched stop elements 221 each comprise a notch 222 and a sloping surface 223 extended from the notch 222. Two third compression springs 224 are bilaterally connected between the periphery of the rear receiving chamber 22 and the arched stop elements 221 to force the arched stop elements 221 against each other, causing the arched stop elements 221 to stop the bolt 33 from passing out of the barrel 2 through the rear receiving chamber 22. A headed stem 31 is inserted through the center through hole 121 of the front end cap 12, having one end (namely, the head) stopped against the head 331 of the bolt 33 and the other end connected to a crimping/cutting block 3 outside the tubular handle 1. The headed stem 31 comprises a longitudinal sliding groove 32. A flat-end screw 122 is mounted in a radially mounted in the front end cap 12 and perpendicularly inserted into the longitudinal sliding groove 32 to guide axial movement of the stem 32 and to stop the stem 32 from rotary motion.

Figure 3:
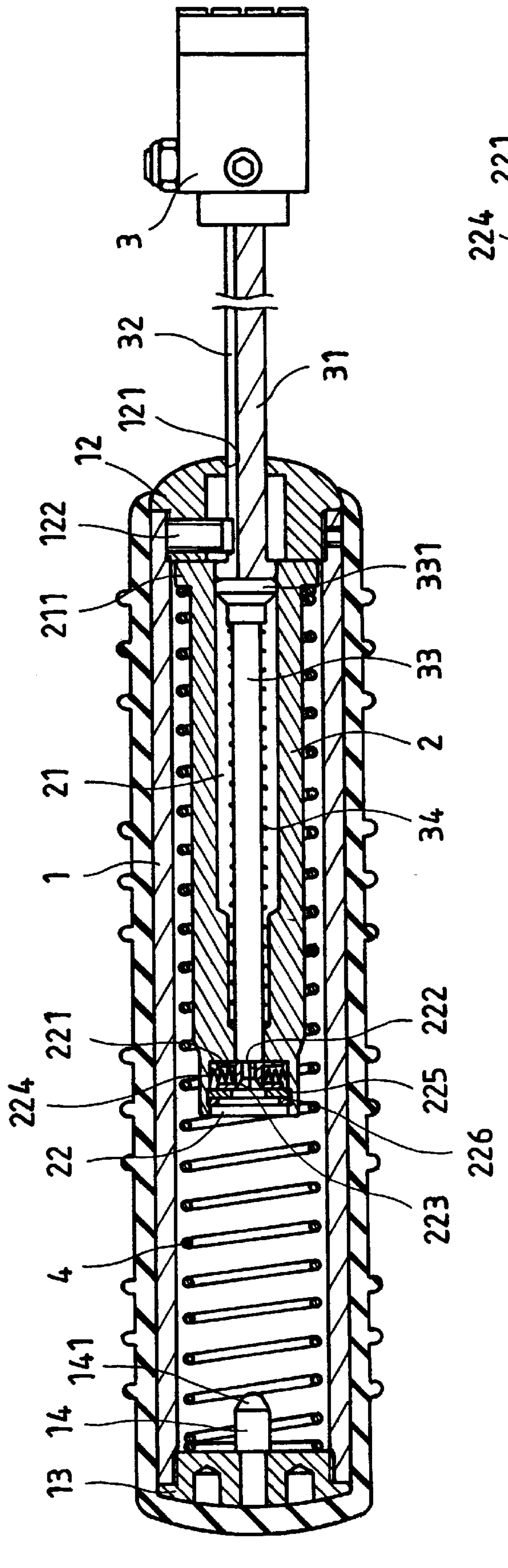
FIG. 3 is a longitudinal view in section of the module jack wire crimping/cutting tool according to the present invention.
Figure 4:
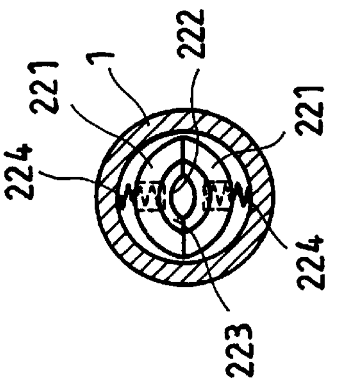
FIG. 4 is a cross sectional view of the present invention showing the arched stop elements abutted against each other.
Figure 5:
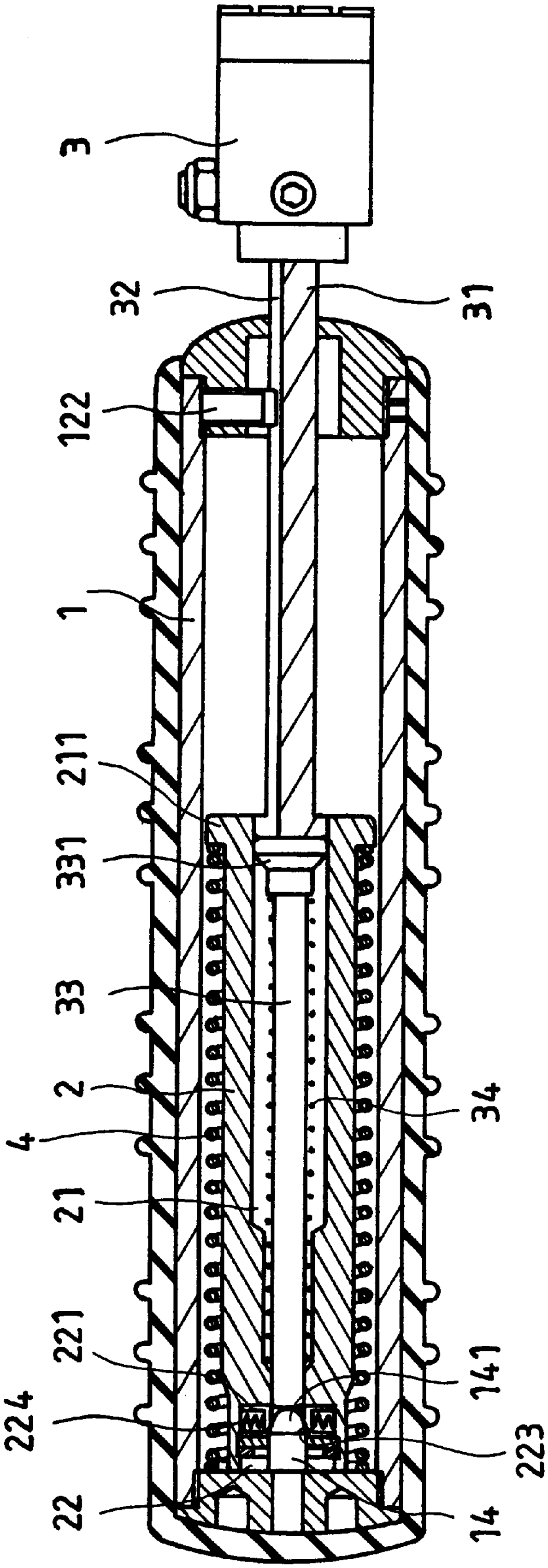
FIG. 5 is a sectional view of the present invention showing the barrel moved backwards to the rear side of the tubular casing.
Figure 6:
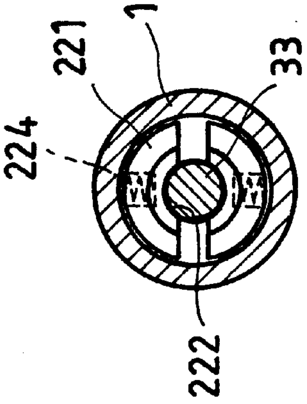
FIG. 6 is a cross sectional view of the present invention, showing the arched stop elements moved apart, the bolt passed through the notch of each arched stop element.
Figure 7:
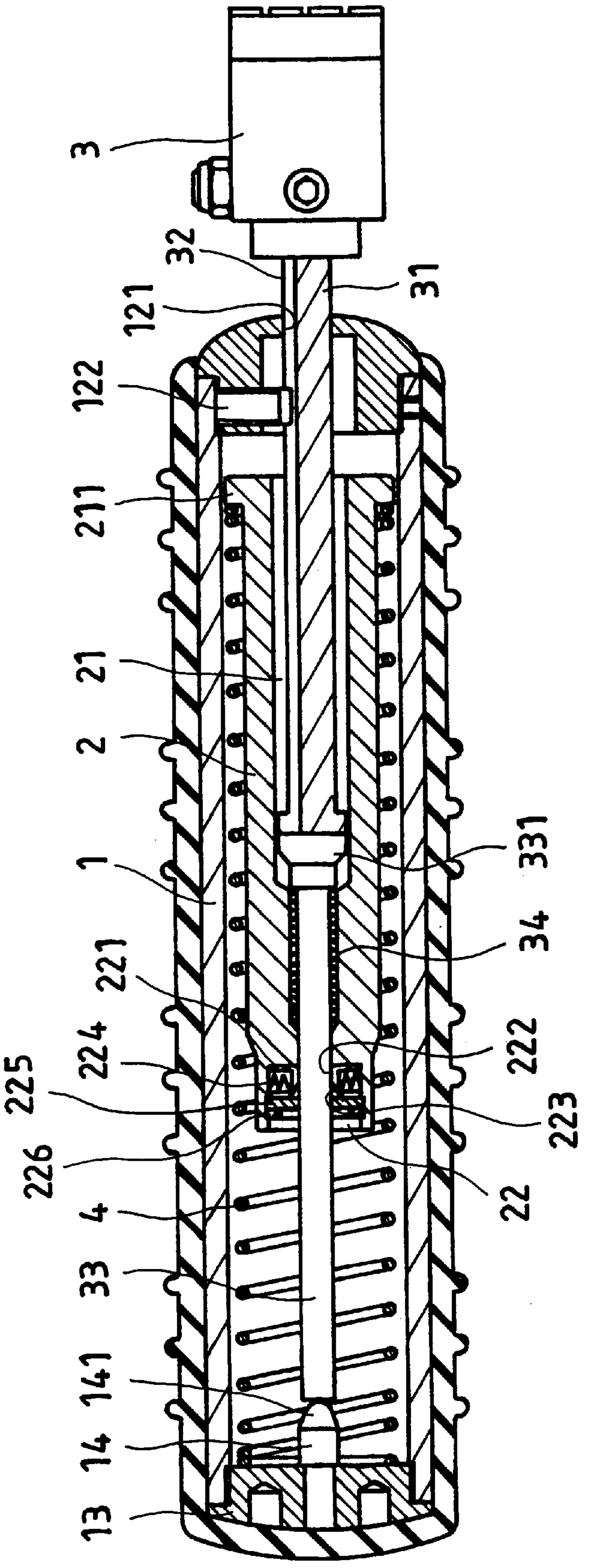
FIG. 7 is a sectional view of the present invention showing the stem received in the tubular casing and the barrel pushed forwards.

Referring to FIGS. from 4 through 7 and FIGS. 1 and 3 again, when in use, the crimping/cutting block 3 is attached to the wires 5 at the module jack, and then the tubular handle 1 is pushed forwards toward the module jack. Because the bolt 33 is stopped from passing out of the rear receiving chamber 22 by the arched stop elements 221, moving the tubular handle 1 toward the module jack does not causes the barrel 2 to be moved with the tubular handle 1, and the first compression spring 4 is compressed during relative movement between the tubular handle 1 and the barrel 2. Continuously moving the tubular handle 1 forwards relative to the barrel 1 causes the rod member 14 to be inserted through the sloping surface 223 of each arched stop element 221 into the notch 221, and therefore the arched stop elements 221 are radially forced outwards for enabling the bolt 33 to pass out of the rear receiving chamber 22 of the barrel 2 into engagement with the conical front tip 141 of the rod member 14, and at the same time the first compression spring 4 is released from constraint to force the barrel 2 forwards, thereby causing the head 331 of the bolt 33 to be pushed forwards against the stem 31. The forward pressure from the stem 31 causes the crimping/cutting block 3 to crimp the wires 5 at the module jack. After crimping, the module jack wire crimping/cutting tool is removed from the module jack, and the second compression spring 34 pushes the bolt 33 back to its former position, and the arched stop elements 221 are forced by the third compression springs 224 to abut against each other again, and therefore the bolt 33 is stopped inside the tubular handle I again.

Figure 8:
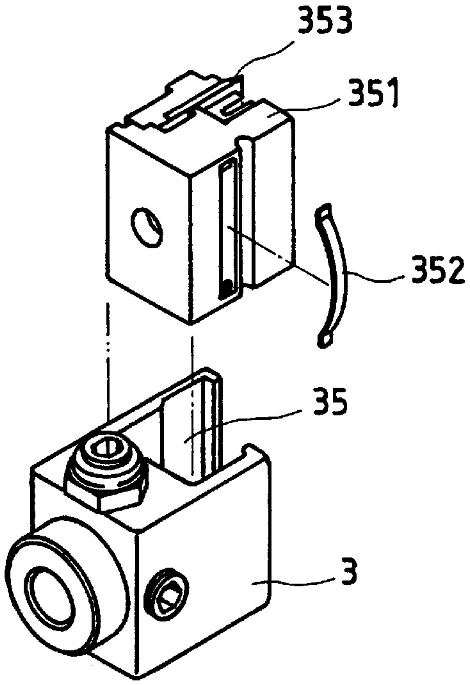
FIG. 8 is an exploded view of the crimping/cutting block for the module jack wire crimping/cutting tool according to the present invention.
Figure 9:
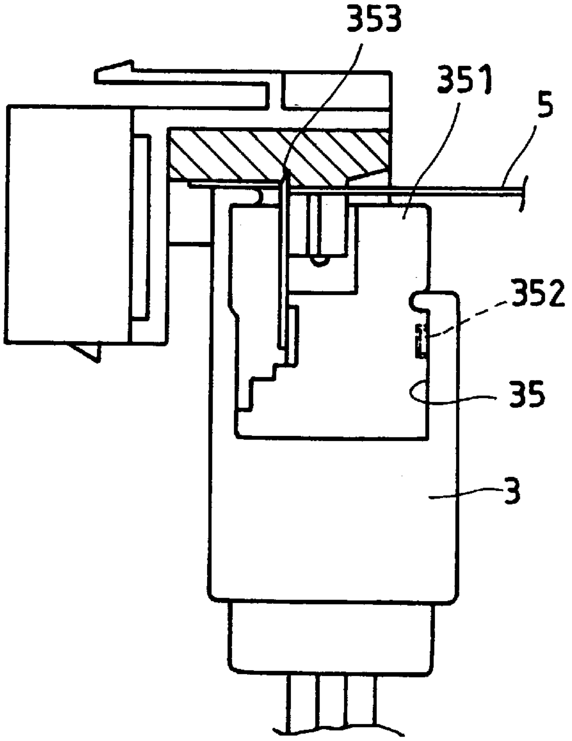
FIG. 9 is a sectional view showing the application of the crimping/cutting block.

Referring to FIGS. 8 and 9, the crimping/cutting block 3 comprises a coupling hole 35, a tool holder 351 mounted in the coupling hole 35 and holding tool elements 353, and a spring 352 fastened to one side of the tool holder 351 and supported on one peripheral side wall of the coupling hole 35.

While only one embodiment of the present invention has been shown and described, it will be understood that various modifications and changes could be made thereunto without departing from the spirit and scope of the invention disclosed.

What the invention claimed is:

1. A module jack wire crimping/cutting tool comprising:

a tubular handle, said tubular handle having a front end, a rear end, and a center through hole axially extended through the front end and the rear end;

a rear end cap fastened to the rear end of said tubular handle to close the rear end of said tubular handle;

a fixed rod member fixedly fastened to said rear end cap and axially suspended in the center through hole of said tubular handle, said fixed rod member having a conical front tip;

a front end cap fastened to the front end of said tubular handle, said front end cap having a center through hole;

a barrel axially slidably mounted in the center through hole of said tubular handle, said barrel comprising an outward flange raised around the periphery of a front end thereof, a rear receiving chamber disposed at a rear end thereof, and a stepped through hole axially extended from said rear receiving chamber to the front end thereof;

a first compression spring mounted inside said tubular handle around said barrel and stopped between said rear end cap and the outward flange of said barrel;

a bolt mounted in the stepped through hole of said barrel and moved in and out of said rear receiving chamber, said bolt having a head at one end thereof;

a second compression spring mounted in the stepped through hole of said barrel around said bolt, and stopped between a part inside said barrel near said rear receiving chamber and the head of said bolt;

two third compression springs mounted in the rear receiving chamber of said barrel at two opposite sides;

two arched stop elements respectively supported on said third compression springs and forced by said third compression springs to abut against each other, said arched stop elements each comprising a notch and a sloping surface extended from said notch;

a washer and a C-shaped clamp fastened to the rear end of said barrel to stop said arched stop elements in the rear receiving chamber of said barrel;

a headed stem inserted through the center through hole of said front end cap, said headed stem having a head stopped against the head of said bolt and a stem body extended out of the center through hole of said front end cap; and a crimping/cutting block fastened to the stem body of said headed stem, said crimping/cutting block comprising a coupling hole, a tool holder mounted in said coupling hole and holding a set of tool elements for crimping/cutting electric wires at a module jack, and a spring fastened to one side of said tool holder and supported on one peripheral side wall of said coupling hole; and wherein when attaching said crimping/cutting block to the module jack to be processed and then moving said tubular handle toward the module jack, said barrel is moved backwards relative to said tubular handle toward said rear end cap to compress said first compression spring and to let the conical front tip of said rod member be inserted through the sloping surface of each of said arched stop elements into the notch of each of said arched stop elements to force said arched stop elements apart for the passing of said bolt to the outside of said barrel through said rear receiving chamber, so that said first compression spring pushes said barrel forwards to force said bolt against said stem and said crimping/cutting block at the module jack after said bolt passed through the rear receiving chamber of said barrel.

* * * * *